Dec. 29, 1964           P. G. TODD           3,163,814
VOLTAGE REGULATOR POWER SUPPLY
Filed Jan. 11, 1961           2 Sheets-Sheet 1
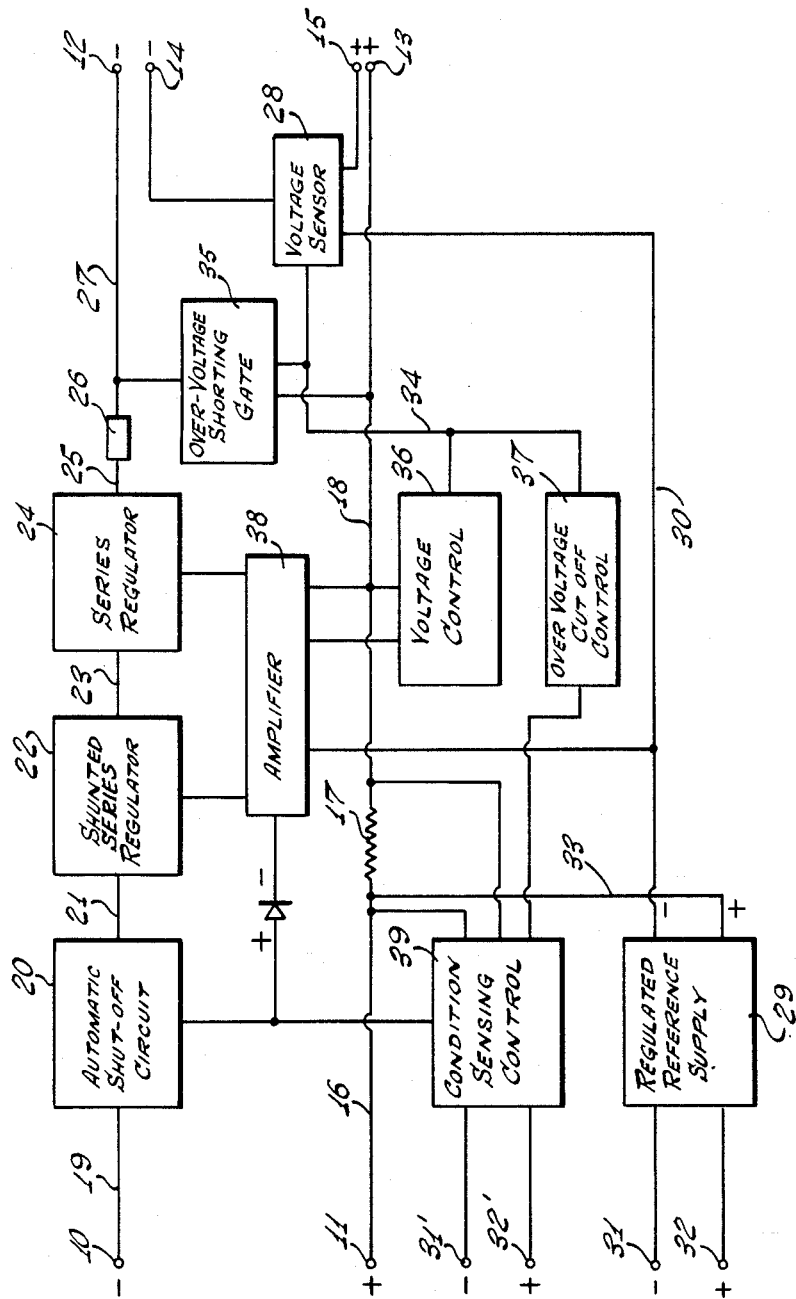
INVENTOR
PAUL G. TODD
BY
ATTORNEY

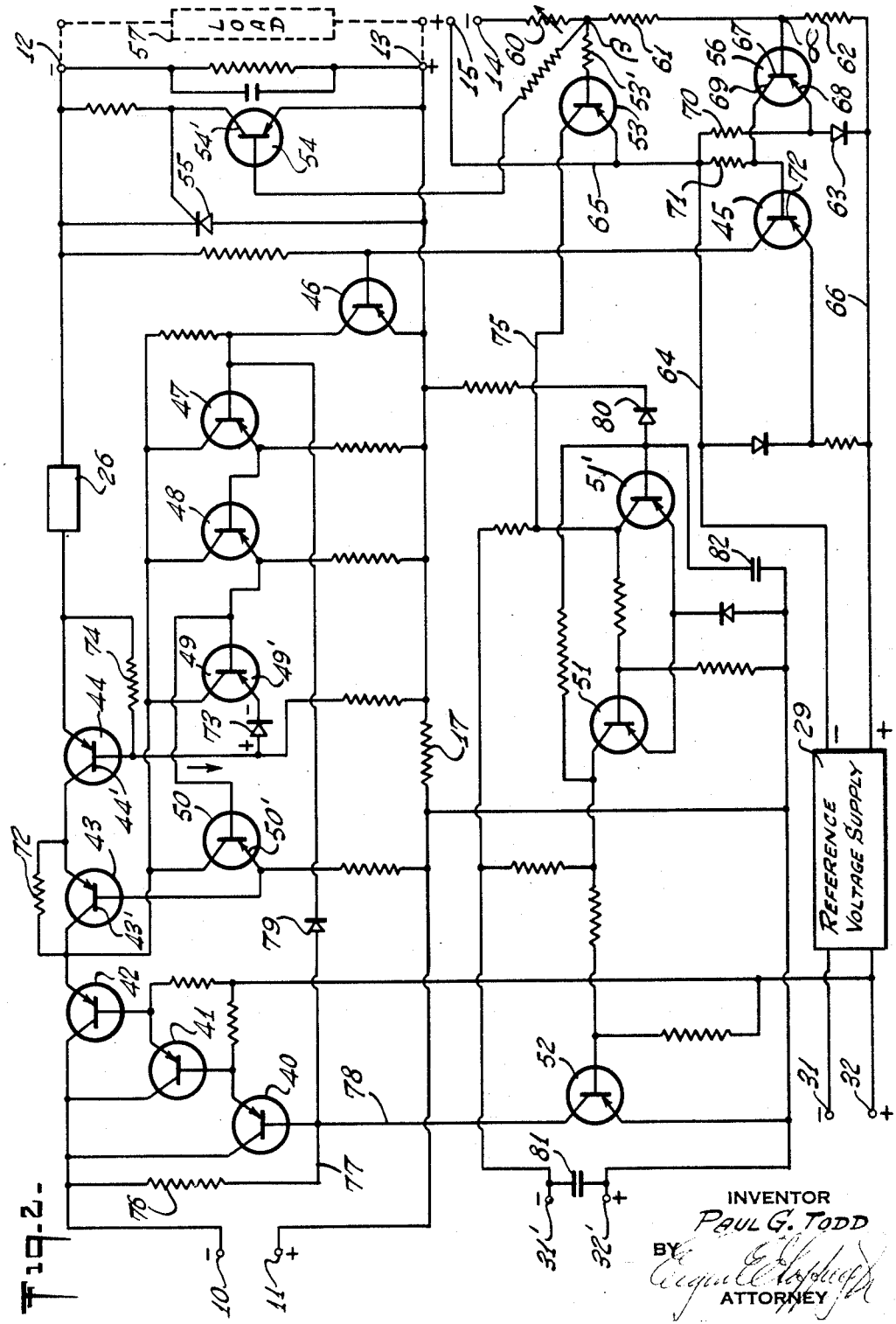

United States Patent Office 3,163,814
Patented Dec. 29, 1964

3,163,814
VOLTAGE REGULATOR POWER SUPPLY
Paul G. Todd, Glen Head, N.Y., assignor to Trygon
Electronics Inc., a corporation of New York
Filed Jan. 11, 1961, Ser. No. 81,978
10 Claims. (Cl. 323—22)

This invention relates to an improved voltage regulated power supply for producing accurately regulated direct current power from an unregulated direct current source or a rectified alternating current source.

Regulated direct current power supplies have been proposed but known devices have not been found satisfactory for many reasons, the more significant being the lack of precise regulation coupled with protective features to prevent costly damage by reason of excess voltage and current, whether caused by the supply or erratic operation of the load. The importance of protective means for direct current supplies cannot be over-emphasized, particularly when the load includes transitorized devices such as amplifiers and the like. In these cases even transient increases in voltage may result in permanent damage to a large number of transistors, costing many hundreds if not thousands of dollars. Moreover, in many cases the stability of operation of the load is a direct function of the voltage applied so that the degree of regulation is a highly significant factor. Still another problem in the supply of direct current involves the condition wherein the load or a portion thereof may be defective and cause large current and voltage transients which may result not only in damage to the supply but also to other devices that may be energized by the same direct current source.

The power supply in accordance with the invention overcomes the disadvantages of prior known supplies and provides improved apparatus that affords continuous regulation with an exceedingly high degree of accuracy, and over relatively wide current ranges. For instance, regulation accuracies of the order of .01% are readily attainable, notwithstanding the current and voltage which the apparatus is designed to supply.

Another object of the invention resides in the provision of a regulated direct current power supply embodying an improved load voltage adjusting and sensing circuit which is characterized by its simplicity and affords automatic compensation of the voltage controlling and protective circuitry, thus avoiding the need for effecting two or more adjustments each time the load voltage is modified. Furthermore, matched or coordinated adjustable components are not required as the entire adjustment is effected by the variation of a single electrical element.

Still another object of the invention resides in the provision of a regulated D.C. supply having improved overcurrent, overvoltage and transient protection as well as means to interrupt power supply operation in the event of a short circuit. These advantages are attained through a novel and improved arrangement of circuit elements that is characterized by its simplicity, efficiency, stability, and dependability.

Another object of the invention resides in the provision of a power supply embodying improved circuitry for effecting both voltage regulation and over-voltage protection.

A still further object of the invention resides in the provision of improved over-voltage and over-current protection for both the power supply and the load connected thereto.

A further object of the invention resides in the provision of a power supply having improved circuitry that will effectively minimize undesirable transient voltages and currents.

The above and other objects and advantages of the invention will become more apparent from the following description and accompanying drawings forming part of this application.

In the drawings:
FIG. 1 is a block diagram of a power supply in accordance with one embodiment of the invention, and
FIG. 2 is a circuit diagram of the embodiment of the invention shown in FIG. 1.

The power supply in accordance with the invention preferably utilizes transistors to effect regulation of the output voltage as well as for the various protective features. Moreover, the transistors utilized to effect directly the desired regulation are arranged to operate at a minimum temperature, thereby insuring a high degree of reliability.

Referring now to the figures and more specifically to FIG. 1 a source of D.C. to be regulated is applied to the input terminals 10 and 11 while the final regulated voltage appears across the output terminals 12 and 13. Remote sensing terminals 14 and 15 enable sensing of the controlled voltage at the load terminals which may be located at a position remote from the supply and thus automatically compensate for line losses. However, inasmuch as difficulties may arise in the line between the power supply and the load, means are provided to sense such difficulties and effect the necessary control to prevent damage to both the supply and the load.

In this embodiment of the invention the input terminal 11 is connected to the output terminal 13 through a lead 16, a low value resistor 17 and the lead 18. The resistor 17, as will be shown, acts as a current sensing device to guard against overcurrent conditions. The circuit connecting the input terminal 10 with the output terminal 12 includes for regulating and control devices which are connected in series. More specifically the terminal 10 is connected via conductor 19 to the automatic shut-off circuit 20 which operates to interrupt the supply of power in the event of an over-voltage or over-current condition. The output of circuit 20 is connected via lead 21 to a shunt regulator 22, to effect a predetermined degree of voltage regulation, then via lead 23, series regulator 24, lead 25, thermal cut-out 26 and lead 27 to the output terminal 12. Thus regulation is effected by the shunted-series and series regulators 22 and 24 while the automatic shut-off circuit 20 and the cut-out 26 function as protective devices. It is to be understood the shunted-series and series regulators 22 and 24, while being essentially regulators, also operate in the nature of protective devices, though for purposes of this description the circuit elements will be identified in accordance with their basic rather than secondary functions.

Voltage control is effected by novel and improved circuitry represented by block 28 to which the sensing terminals 14 and 15 are connected. This circuit includes a single adjustable electrical element for setting the output or load voltage and produces an error voltage corresponding to the difference between the selected output voltage and a reference voltage derived from the reference voltage supply via lead 30 and related to the selected output voltage. The reference supply is fed by a separate source of D.C. connected to terminals 31 and 32 and the positive output terminal is connected to terminal 11 via leads 33 and 16. The output of the sensor 28 appears on the lead 34 and feeds three separate elements, namely, the over-voltage shorting gate 35, the voltage control 36, and the over-voltage cut-off control 37.

The voltage control 36 functions through the amplifier 38 to operate the shunted-series and series regulators 22 and 24 to maintain the desired output voltage. The overvoltage control 37 actuates the condition sensing control 39 which in turn operates the automatic shut-off circuit in the event over-voltage occurs. The condition sensing control is preferably supplied by a separate source of D.C. connected to terminals 31' and 32'. In addition to sensing over-voltage conditions, the condition sensing control is also activated by an over-current condition which produces an excessive voltage drop across resistor 17. While this aspect of the invention is fundamentally for the purpose of protecting both the power supply and supply lines, it also affords protection for the load, since a load defect producing excessive current can result in still further damage to the load.

Over-voltage protection is also afforded by the over-voltage shorting gate 35. The over-voltage shorting gate 35 functions to short the supply conductors 27 and 18, thus interrupting all power to the load and at the same time tripping the condition sensing control 39 so that the automatic shut-off circuit functions to place a high impedance in series with conductors 19 and 21.

The thermal cut-out 26 is arranged to respond to the temperatures of control elements in the shut-off circuit 20, and the shunted series and series regulators 22 and 24. The control elements in the instant embodiment of the invention are transistors which are mounted on a common support or heat sink and the temperature of the heat sink is sensed by the thermal cut-out.

Reference is now made to the circuit of FIG. 2 in which elements corresponding to elements of FIG. 1 have been denoted by like numerals. To facilitate correlation of the two figures, the automatic shut-off circuit 20 includes transistors 40, 41 and 42, the shunted regulator 22 includes transistor 43, the series regulator 24 includes transistor 44, the amplifier 38 includes transistors 45 to 50 inclusive, the condition sensing control 39 includes transistors 51, 51' and 52, the over-voltage control includes transistor 53, the over-voltage shorting gate includes transistor 54 and controlled rectifier 55, and voltage control 36 includes transistor 56.

The output voltage which appears across terminals 12 and 13 and is applied to the load represented by the dotted block 57 is sensed by an electrical network connected with terminals 14 and 15. As pointed out above, these terminals are usually connected directly to the load 57 in order to compensate for losses in the interconnecting lines.

The voltage sensing circuit consists essentially of a single adjustable resistor 60, fixed resistors 61 and 62, transistor 56 and a Zener or constant voltage diode 63. The adjustable resistor 60 functions as the output voltage control and further by reason of the improved arrangement of sensing elements, the resistor 60 also functions to alter circuit constants to cause the protective circuits to function properly with reference to any selected output voltage. This overcomes the need for making multiple adjustments of the over-voltage protection circuit each time a new regulated output voltage is selected. It is also possible to arrange a variable input voltage control in ganged relationship to the control 60 so that as the latter is changed the voltage applied to terminals 10 and 11 will be changed and the voltage controlling elements can operate within a more ideal range.

The novel and improved regulator action will be understood from the following analysis which shows how both voltage control and over-voltage sensing is attained with a single adjustment. The sensing circuit, when terminals 12 and 14 are interconnected and terminals 13 and 15 are interconnected, includes the series connected output and reference voltages, the latter produced by supply 29, and a voltage divider consisting of resistors 60, 61 and 62 connected across the series connected voltages taps on the divider which are denoted by $\alpha$ and $\beta$. This circuit therefore includes the reference supply 29, conductors 64 and 65 connecting the negative side of the supply 29 to terminal 15, terminal 13, terminal 12, terminal 14, resistors 60 to 62 and conductor 66 to the positive side of supply 29. The transistor 56 has its base 67 connected to the point $\alpha$ on the voltage divider and its emitter 68 connected through the Zener diode 63 to the conductor 66.

Voltage regulating action which maintains a predetermined output voltage is effected by the transistor 56 which compares the voltage $V_Z$ appearing across the diode 63 with the voltage across resistor 62 with the result that $V_{be}$ of the transistor is normally zero when the output voltage across terminals 12 and 13 is correct. Note that the diode 63 is connected in series with resistor 70 across the supply 29 and the collector 69 has a load resistor 71 connected to conductor 64.

The divider attenuations for the two selected points on the divider are:

(1) $$\alpha = \frac{R_{62}}{R_{60}+R_{61}+R_{62}}$$

(2) $$\beta = \frac{R_{61}+R_{62}}{R_{60}+R_{61}+R_{62}}$$

where $R_{60}$, $R_{61}$, and $R_{62}$ are the corresponding resistance values for the respective resistors 60, 61 and 62.

If $E_o$ is the output voltage on terminals 12 and 13 and $V_R$ is the voltage of supply 29 then (3) $$\alpha(E_o+V_R) = V_Z$$

If it is assumed that (4) $$\beta(E_o+V_R) = V_R$$

then the voltage across $R_{60}$ will at all times be equal to $E_o$ since the voltage across $R_{61}+R_{62}$ will equal $V_R$.

From Equation 3

(5) $$E_o = \frac{V_Z}{\alpha} - V_R$$

now substituting from Equation 1, (6) $$E_o = V_Z = \frac{(R_{60}+R_{61}+R_{62})}{R_{62}} - V_R$$

but since $R_{61}$, $R_{62}$, $V_R$ and $V_Z$ are constant, then (7) $$E_o = \frac{V_Z R_{60}}{R_{62}} + \left[\frac{V_Z(R_{61}+R_{62})}{R_{62}} - V_R\right]$$

The output voltage $E_o$ therefore varies linearly with the value of $R_{60}$ since the second term on the right-hand side of Equation 7 is a constant.

From Equation 4

$$E_o = \frac{V_R}{\beta} - V_R$$

and substituting from Equation 2, $$E_o = \frac{V_R(R_{60}+R_{61}+R_{62})}{R_{61}+R_{62}} - V_R$$

and thus, (8) $$E_o = \frac{V_R R_{60}}{R_{61}+R_{62}}$$

Since $E_o$ again varies linearly with $R_{60}$ Equation 8 is valid.

It follows therefore that the values of the resistors forming the divider can be selected so that the voltage across $R_{60}$ will at all times equal the voltage delivered by the power supply ($E_o$). Furthermore the voltage across $R_{61}+R_{62}$ will always equal $V_R$ when the conditions of Equations 3 and 4 obtain. Should the output voltage $E_o$ rise for any reason whatsoever, point $\beta$ on the divider will become negative with respect to terminal 13. This will upset the balance in transistor 56 causing it to draw less collector current through resistor 71 and making the base 72 of transistor 45 more positive. As will be explained this action will tend to effect a reduction in the output voltage. If the output voltage is not reduced by the regulating action or if it cannot be reduced fast enough, then the voltage at point $\beta$ which is negative with reference to terminals 13 and 15 will provide overload signals for transistors 53 and 54.

From the foregoing it is evident that a single adjustable electrical element such as the resistor 60 can be used to change the output voltage of the supply and it will at the same time modify the voltage divider so that the over-voltage indications will be changed accordingly.

The sensing circuitry controls the operation of associated circuits to effect the desired voltage relation and prevent excessive voltages and currents. Regulation is accomplished by the shunted regulator 22, which includes transistor 43, and the series regulator 24 which includes transistor 44. Transistors 43 and 44 are operated to introduce their collector-emitter impedances in series with the negative conductor and in this way control the output voltage. Since the operation of transistors is well known, much of the circuitry is clear from the drawings, a detailed description of the entire circuitry is not deemed necessary.

As previously mentioned, the sensing transistor 56 produces a signal in response to a change in the load voltage (terminals 12 and 13) and this signal is amplified by the voltage amplifiers 45 and 46. Transistors 47 and 48 are connected as emitter-followers or current amplifiers and transistor 48 drives the transistors 49 and 50 in parallel. Transistor 50 is connected as an emitter-follower and its emitter 50' is connected to the base 43' of the shunted-series regulator 22, which has been given that terminology because the transistor 43 is effectively in parallel with a fixed resistor 72'. Thus any change in potential on the base of transistor 43 will vary its collector-emitter impedance and thus increase or decrease the current supplied to the load 57. Simultaneously with the control of transistor 43, the transistor 49 controls transistor 44 by reason of the connection of the emitter 49' through a diode 73 to the base 44' of the transistor 44. The diode 73 operates as a constant voltage biasing device for transistor 44 since the latter is operating in a voltage range more positive than transistor 43.

The protective circuitry to guard against over-voltage and over-current conditions functions in several ways so that failure of a single element or circuit will not result in loss of control.

The basic control circuit, namely the condition sensing control 39 utilizes transistors 51', 51 and 52 in the form of a monostable or latching type multivibrator. Under normal conditions, transistor 51 is in a conducting state while transistors 51' and 52 are non-conducting. Now assume an over-voltage condition wherein point β becomes more negative and lowers the bias on transistor 53 via resistor 53'. This will result in a decrease in negative potential on lead 75 and cause transistor 51 to go into a non-conducting state. At the same time transistor 51' is locked in a conducting condition, causing transistor 52 to conduct heavily and draw current through resistor 76 and leads 77 and 78. Transistors 40 and 41 connected as emitter-followers amplify the signal produced by transistor 52 and the amplified signal places transistor 42 in a non-conducting state. Thus an over-voltage condition will automatically interrupt the flow of energy by introducing a high impedance in series with the circuit connecting terminal 10 with terminal 12.

Simultaneously with the biasing of transistor 42 to a non-conducting condition in the event of an over-voltage condition, the signal on lead 77 is fed through a diode 79 to the base of transistor 47. In so doing, the operation of the succeeding amplifier stages is blocked and transistors 43 and 44 are also biased to a non-conducting condition. Thus, if for any reason transistor 42 failed to interrupt the flow of current on an over-voltage condition, transistors 43 and 44 would effect the desired end.

In certain cases an over-current condition may occur before an over-voltage condition is detected. In such a case the series resistor 17 would register an increased voltage drop and change the emitter-base potential on transistor 51' causing it to move into a conducting state as described in connection with an over-voltage condition. The diode 80 limits flow of current to a single direction and prevents application of reverse potentials that would interfere with the desired operation of the circuit.

In order to prevent starting transients, produced when the supply is first turned on, from tripping the condition sensing circuit, the latter is fed from a supply having an exceedingly large condenser 81 connected across it. In this way voltage for operation of the condition sensing circuit is delayed for a short interval to permit stabilization of the other circuitry. Condenser 82 minimizes the effect of very short transients that may occur during normal operation and which while not damaging may function to interrupt operation of the supply.

Still another over-voltage protection circuit is provided in the form of transistor 54 and controlled rectifier 55. It will be observed that transistor 54 which is effectively connected between terminals 12 and 13 is actuated by a signal developed at point β. An over-voltage condition causes conduction of transistor 54 and makes the potential of the collector 54' more positive. This increase in negative voltage (the over-voltage condition) trips the controlled rectifier 55 placing a virtual short circuit across terminal 12 and 13. In so doing the increased drop across resistor 17 trips the condition sensing circuit as previously described to interrupt operation of the supply.

In the supply in accordance with the invention, PNP transistors have been utilized and the circuitry indicates that the transistors are PNP units. However, it is evident that NPN transistors or even vacuum tubes may be used to obtain like results. It is also to be observed that in the case of transistors 42, 43 and 44, which actually carry the load current, that additional transistors may be connected in parallel to handle and control any desired load current.

While only one embodiment of the invention has been illustrated and described, it is understood that changes, alterations and modifications may be made without departing from the true scope and spirit thereof as defined by the appended claims.

What is claimed is:

1. In a power supply, means for regulating the output voltage, protective means responsive to the output voltage and operable to interrupt the output voltage in the event the output voltage exceeds a predetermined value, a stabilized reference supply, a voltage divider having discrete impedance sections connected with said output and reference supply voltages to produce a current through said divider proportional to the magnitude of the combined voltages, connections between said divider and said regulating and protective means, and means for modifying the impedance of at least one section of said divider to simultaneously and automatically adjust the output voltage and said protective means whereby the latter will respond to a predetermined voltage rise relative to any selected output voltage.

2. In a power supply according to claim 1 wherein said voltage divider includes a plurality of series connected resistors with one of said resistors being adjustable in value, and said voltage regulating means is interconnected with a fixed voltage source and another of said resistors and responds to a predetermined difference between the voltage drop across the last said resistor and said voltage source to regulate the output voltage.

3. A D.C. voltage regulator comprising a source of D.C. voltage having a pair of terminals, a pair of output terminals, first and second variable impedance means connected in series one with the other and between one terminal of said source and one output terminal, a connection between the other terminal of said source and the other output terminal, a first circuit connected with the first said impedance means to maintain normally its impedance at a minimum value, a second circuit connected with said second impedance means for varying the impedance of the second impedance means to control the voltage at said output terminals, a reference voltage supply, a voltage divider having at least two discrete series connected impedances, said voltage divider, output terminals and reference supply being connected in series to produce a current through the voltage divider proportional to the magnitude of the combined output and reference voltages, a connection between said first circuit and one point on the voltage divider, a connection between said second circuit and another point on said voltage divider, one of said voltage divider impedances being adjustable to select a predetermined output voltage by influencing said second circuit to modify said second variable impedance means and automatically maintain said selected output voltage, said one voltage divider impedance further influencing said first circuit to maintain said first variable impedance at said normal minimum value when the output voltage is at a selected value and to trip said first circuit to change said first variable impedance to a maximum value should the output voltage rise to a predetermined level above the selected output voltage.

4. A D.C. voltage regulator according to claim 3 wherein said first and second variable impedances are electron controlled devices selected from the group consisting of transistors and electron tubes.

5. A D.C. voltage regulator according to claim 3 wherein said voltage divider impedances comprise a variable resistor $R_1$ and fixed resistors $R_2$ and $R_3$, said first circuit is connected between $R_1$ and $R_2$, said second circuit is connected between $R_2$ and $R_3$, said output voltage has a magnitude $E_o$, said reference voltage has a magnitude $V_R$ and said resistors are proportioned so that the attenuation $\alpha$ at one point of the divider is $$\frac{R_3}{R_1+R_2+R_3}$$

the attenuation $\beta$ at another point on the divider is $$\frac{R_2+R_3}{R_1+R_2+R_3}$$

and $$E_o = \frac{V_R \cdot R_1}{R_2+R_3}$$

6. A D.C. voltage regulator according to claim 3 wherein said second circuit includes a fixed potential source and means continuously comparing said fixed potential source with the voltage at said other point on the voltage divider.

7. A D.C. voltage regulator according to claim 3 wherein said connection between the other terminal of said source and the other output terminal includes a series impedance and said first circuit is interconnected with the last said series impedance whereby said first circuit is actuated by the presence of excessive current to cause said first impedance means to assume its maximum impedance.

8. A D.C. voltage regulator according to claim 7 including an electrically actuated normally open switch connected across said output terminals and a third circuit connected with said voltage divider to actuate said switch to a closed position when the output voltage reaches a predetermined level above the selected output voltage.

9. In apparatus for regulating a D.C. voltage, a pair of input terminals for connection to a source of direct current voltage, a pair of output terminals, a connection between one of said input terminals and one of said output terminals, at least two series connected series regulators connecting the other input terminal to the other output terminal, each of said series regulators including a variable impedance electron device, a resistor shunting one of said electron devices, an electrical circuit connected with said output terminals and responsive to changes in the output voltage to produce a signal proportional to the departure of said output voltage from a predetermined output voltage and means connecting the last said circuit with said series regulators to apply said signal to said electron devices and vary the impedance of said devices to return said output voltage to said predetermined value.

10. In apparatus for regulating a D.C. voltage according to claim 9 wherein each of said variable impedance electron devices is a transistor.

References Cited by the Examiner

UNITED STATES PATENTS

| 2,832,900 | 4/58 | Ford | 323—22 |
| 2,915,693 | 12/59 | Harrison | 323—22 |
| 2,981,884 | 4/61 | Tighe | 323—22 |
| 3,028,538 | 4/62 | Rosenfeld | 323—22 |
| 3,101,442 | 8/63 | Darbie | 323—22 |

FOREIGN PATENTS 1,237,629 6/60 France.

LLOYD McCOLLUM, *Primary Examiner.*

MILTON O. HIRSHFIELD, *Examiner.*